US008225774B2

(12) United States Patent
Chen et al.

(10) Patent No.: US 8,225,774 B2
(45) Date of Patent: Jul. 24, 2012

(54) LUBRICATION SYSTEM FOR A FOUR-STROKE ENGINE

(75) Inventors: Chun-Chin Chen, Taoyuan (TW);
Cheng-Tsung Yang, Kaohsiung (TW);
Fredrik Johansson, Jönköping (SE);
Lars Andersson, Västra Frölunda (SE)

(73) Assignee: Husqvarna Aktiebolag, Huskvarna (SE)

( * ) Notice: Subject to any disclaimer, the term of this patent is extended or adjusted under 35 U.S.C. 154(b) by 239 days.

(21) Appl. No.: 12/633,409

(22) Filed: Dec. 8, 2009
(Under 37 CFR 1.47)

(65) Prior Publication Data
US 2010/0307448 A1 Dec. 9, 2010

Related U.S. Application Data

(63) Continuation-in-part of application No. PCT/SE2008/050675, filed on Jun. 5, 2008.

(30) Foreign Application Priority Data

Jun. 8, 2007 (TW) ................................ 96209438 U

(51) Int. Cl.
*F01M 9/00* (2006.01)

(52) U.S. Cl. .................................. 123/572; 123/196 R

(58) Field of Classification Search .......... 123/572–574, 123/41.86, 196 R–196 CP
See application file for complete search history.

(56) References Cited

U.S. PATENT DOCUMENTS

| 4,156,416 | A | * | 5/1979 | Weisgerber et al. | ...... | 123/196 R |
| 5,190,121 | A | * | 3/1993 | Muzyk | ............ | 184/6.5 |
| 5,960,764 | A | * | 10/1999 | Araki | ......... | 123/196 R |
| 6,145,484 | A | * | 11/2000 | Funakoshi et al. | ....... | 123/73 AD |
| 6,877,474 | B2 | * | 4/2005 | Radel | ......... | 123/196 R |
| 7,987,832 | B2 | * | 8/2011 | Lin | ............. | 123/196 R |

* cited by examiner

*Primary Examiner* — M. McMahon
(74) *Attorney, Agent, or Firm* — Novak Druce + Quigg LLP

(57) ABSTRACT

A lubrication system for a four stroke engine including an oil pan for storing lubrication oil; a crankcase, wherein a crankshaft is disposed, which crankshaft has a balance weight and is coupled with a piston of a cylinder; a gear assembly room; a rocker-arm chamber; and a gas-oil separator for separating gas and oil from a mix of gas and oil; wherein the oil pan communicates with the crankcase by an oil suction passage, in which a first check valve is disposed; the crankcase communicates with the gear assembly room by a first oil delivery passage; the gear assembly room communicates with the rocker-arm chamber by a second oil delivery passage, and the gear assembly room communicates with the oil pan by a third oil delivery passage; the rocker-arm chamber communicates with the crankcase by a first oil return passage having a second check valve therein.

24 Claims, 15 Drawing Sheets

LUBRICATION SYSTEM FOR A FOUR-STROKE ENGINE

CROSS-REFERENCE TO RELATED APPLICATIONS

The present application is a continuation-in-part of International Application No. PCT/SE2008/050675, filed Jun. 5, 2008, which was published in English pursuant to Article 21(2) of the Patent Cooperation Treaty, and which claims priority to: Taiwan Application No. 96209438, filed Jun. 8, 2007; International Application No. PCT/SE2008/050555, filed May 13, 2008; and International Application No. PCT/SE2008/050598, filed May 21, 2008. Said applications are expressly incorporated herein by reference in their entirety.

FIELD

The present disclosure relates to a lubrication system for a four-stroke engine.

BACKGROUND

Conventional two-stroke and four-stroke small utility engines have been widely used in the gardening, the agricultural machinery and in industry applications, such as lawn mowers, chain saws, tillers, generators, portable brush cutters, blowers, etc. The disadvantage of the two-stroke engine is that the engine lubricant is mixed with the fuel, thus significantly increasing the emission of pollutants. As the pollution emission regulations become more and more strict, two-stroke engines are being replaced with four-stroke engines in as many applications as possible. However, the four-stroke engine has a more complicated lubrication system, which makes the engine less functional when operated at an inclined angle. Lubrication becomes the major design problem for every engine manufacturer. At present, only the HONDA Company has mature techniques for the four-stroke engine working at various inclined angles and has put it into mass production, compare EP 835 987. A special oil tank surrounds rotary blades mounted on the crankshaft to create oil mist. Although efficient for its purpose the engine is wider, heavier and more costly than a splash lubricated engine as described below. U.S. Pat. No. 6,213,079 by Fuji Robin shows an engine with a complex and probably vulnerable lubrication system. Especially it involves a complicated system of oil return passages from its rocker arm chamber to its crankcase and its oil tank. The conventional four-stroke small engine uses an oil pump to pump the lubrication oil to lubricate the engine parts (both the automobile and motorcycle four-stroke engines are lubricated by this method). Another lubricating method of the utility engine uses a hook dipping into the oil and splashing the oil to lubricate the engine. However, the splash lubrication also has limitations for engine operation at an inclined angle of the engine.

SUMMARY

A primary objective of the present disclosure is to provide an engine lubrication system, which allows the engine to function properly and maintain its lubrication function even though the engine is operated at inclined angles, thereby increasing the engine competitiveness.

Another objective of the present disclosure is to provide a low-cost engine lubrication system, which can make the engine maintain a proper lubrication function without increasing the cost of the engine parts.

Yet another objective of the present disclosure is to provide a low-weight engine, with a low-cost lubrication system which is able to operate at various inclined angles without losing the lubrication function.

These objects are reached by a lubrication system as described in the following:

A lubrication system for a four stroke engine, comprising: an oil pan for storing lubrication oil; a crankcase, wherein a crankshaft is disposed, which crankshaft has a balance weight and is coupled with a piston of a cylinder; a gear assembly room; a rocker-arm chamber; and a gas-oil separator for separating gas and oil from a mix of gas and oil; wherein the oil pan is communicated with the crankcase an oil suction passage, in which a first check valve is disposed; the crankcase is communicated with the gear assembly room by a first oil delivery passage; the gear assembly room is communicated with the rocker-arm chamber by a second oil delivery passage, and the gear assembly room is communicated with the oil pan by a third oil delivery passage; the rocker-arm chamber is communicated with the crankcase by a first oil return passage, in which a second check valve is disposed.

Preferably the first oil return passage is the only oil return passage from the rocker arm chamber. This provides a clear simplification compared to U.S. Pat. No. 6,213,079.

When the piston of the engine moves upward in the cylinder to form a negative pressure in the crankcase, the crankcase can suck lubrication oil from the oil pan, a rocker-arm chamber and a gas-oil separator. When the piston moves downward to form a positive pressure in the crankcase, the lubrication oil and the gas in the crankcase can be compressed into the gear assembly room. At the same time the gear assembly room is in positive pressure. Therefore, the lubrication oil and the gas in the gear assembly room can be compressed into the rocker-arm chamber and the oil pan simultaneously. The gas in the oil pan is in positive pressure and enters the gas-oil separator to separate the lubrication oil from the gas. The separated gas is delivered into the cylinder to be burnt in the cylinder and the separated lubrication oil is sucked into the crankcase at next stroke as the piston moves to make the crankcase be in negative pressure. Accordingly, the lubrication oil circulation of the engine is completed. Moreover, as the engine is inclined or even turned upside down, the lubrication oil can be restricted to the oil pan so as to prevent a great deal of lubrication oil from entering the combustion chamber to cause engine flameout. At the same time the lubrication system can keep functioning.

The technique of the present disclosure is that an oil pan is communicated with a crankcase by an oil suction passage, at which a first check valve is disposed; the crankcase is communicated with a gear assembly room by a first oil delivery passage in which a fourth check valve is disposed; the gear assembly room is communicated with a rocker-arm chamber by a second oil delivery passage, and the gear assembly room is communicated with the oil pan by a third oil delivery passage; the rocker-arm chamber is communicated with the crankcase by a first oil return passage, at which a second check valve is disposed; a gas-oil separator is communicated with the crankcase by a second oil return passage, at which a third check valve is disposed; and the gas-oil separator is communicated with the oil pan by a gas intake passage, and the gas-oil separator is communicated with the cylinder by a gas outlet passage. When the piston of the engine moves upward in the cylinder to form a negative pressure in the crankcase, the first check valve, the second check valve and the third check valve are opened, so that the lubrication oil in the oil pan, the rocker-arm, the gas-oil separator are sucked into the crankcase. When the piston moves downward in the cylinder to form a positive pressure in the crankcase, the lubrication oil and the gas in the crankcase are compressed into the gear assembly room to form a positive pressure in the gear assembly room; thus the lubrication oil and the gas in the gear assembly room are compressed into the rocker-arm chamber and the oil pan. Next, the gas entering the oil pan makes the oil pan be in positive pressure and is delivered into the gas-oil separator to separate the lubrication oil from the gas. The separated gas is delivered into the cylinder and the separated lubrication oil is sucked into the crankcase, thereby completing the lubrication oil circulation of the engine.

The first check valve according to a preferred configuration includes a valve body disposed in the oil suction passage, a ball and a spring acting on the ball. As the first check valve experiences no external forces, the ball keeps on plugging the oil suction passage so as to prevent the lubrication oil in the crankcase from flowing back to the oil pan. As the crankcase is in negative pressure and resists against the elasticity of the spring, the ball is separated from the valve body so that the lubrication oil can enter the crankcase through the first check valve. As the crankcase is in positive pressure, the ball blocks off the valve body due to the elasticity of the spring.

The second check valve and the third check valve according to a configuration of the present disclosure are made of a polymeric or rubber material. As the check valve experiences no external forces, an opening of the check valve can be blocked off due to the elasticity itself. As the polymeric check valve is acted by the pressure, the opening can be opened.

Alternatively, the first, the second and the third check valves are one and the same valve, which valve is preferably a rotary valve or a valve opened and closed by the moving piston a so called piston ported valve. Such rotary valve can be formed by a through-hole in the crankshaft, which first end is disposed in the crankcase and the second being distanced from the first end and being arranged to open between certain angles of rotation. Preferably, the rotary valve is open only for negative pressure in the crankcase, which implies that the oil suction passage and the first- and the second oil return passage are arranged to be fluidly connected to each other and to the crankcase only for negative pressure. The negative pressure implies that the gas/lubrication oil is sucked through said passages from the rocker-arm chamber, the gas-oil separator and the oil pan into the crankcase. For positive pressure in the crankcase the rotary valve is closed and there is no such connection between each of the three passages or between the three passages and the crankcase. It is of course possible to have an arrangement where e.g. two of the three passages are fluidly connected also for positive pressure in the crankcase. This type of valve saves both weight and cost.

Preferably, the first oil delivery passage is provided with a fourth check valve preferably also in the form of a rotary valve, so as to allow a flow of gas/lubrication oil from the crankcase to the gear assembly room only for positive pressure in the crankcase. The inlet and outlet ducts leading to and from the rotary valve can also be arranged outside the crankcase and have ports facing the crankcase as further described later.

Moreover, the oil pan is provided with a gas delivery passage communicated with the gas intake passage, in which a pin pole is disposed. As the engine is turned upside down, the pin pole is capable of plugging the exit of the gas delivery passage due to the weight of the pin pole, so that the gas and the lubrication oil can be prevented from being delivered into the gas-oil separator. Also, the third oil delivery passage may be provided with a valve for closing the connection between the oil pan and the gear assembly room for the upside down state of the engine.

Preferably, an opening of the gas delivery passage is disposed in the oil pan at a position that is always above the oil level irrespective of operational attitude of the engine. Thereby, lubrication oil is prevented from being sucked into the gas-oil separator from the oil pan.

Alternatively, the second oil return passage, in which the third check valve is disposed, communicates the gas-oil separator with the oil pan and the gas intake passage communicates the oil pan with the gas-oil separator. Thereby, gas flows from the oil pan into the gas-oil separator for positive pressure in the oil pan and lubrication oil flows from the gas-oil separator to the oil pan for negative pressure in the oil pan.

Alternatively, the second oil return passage, in which the third check valve is disposed, communicates the gas-oil separator with the oil pan and the gas intake passage communicates the crankcase with the gas-oil separator. Thereby, gas flows from the crankcase into the gas-oil separator for positive pressure in the crankcase and lubrication oil flows from the gas-oil separator into the oil pan for negative pressure in the oil pan. For preventing gas/lubrication oil from flowing from the gas-oil separator into the crankcase a fifth check valve may be disposed in the gas intake passage, only allowing a flow from the crankcase into the gas-oil separator.

Thus, by the check valves and the pressure variations in the crankcase, the lubrication system according to the present disclosure not only can make the lubrication oil lubricate parts of the engine as the lubrication oil circulates in the engine, but also prevent the lubrication oil from entering the combustion chamber to cause engine flameout as the engine is inclined. Thus, the lubrication system functions properly irrespective of the angle of inclination of the engine.

BRIEF DESCRIPTION OF THE DRAWINGS

The present disclosure will be apparent to those skilled in the art by reading the following detailed description of a preferred embodiment thereof, with reference to the attached drawings, in which.

DETAILED DESCRIPTION

Figure 1:
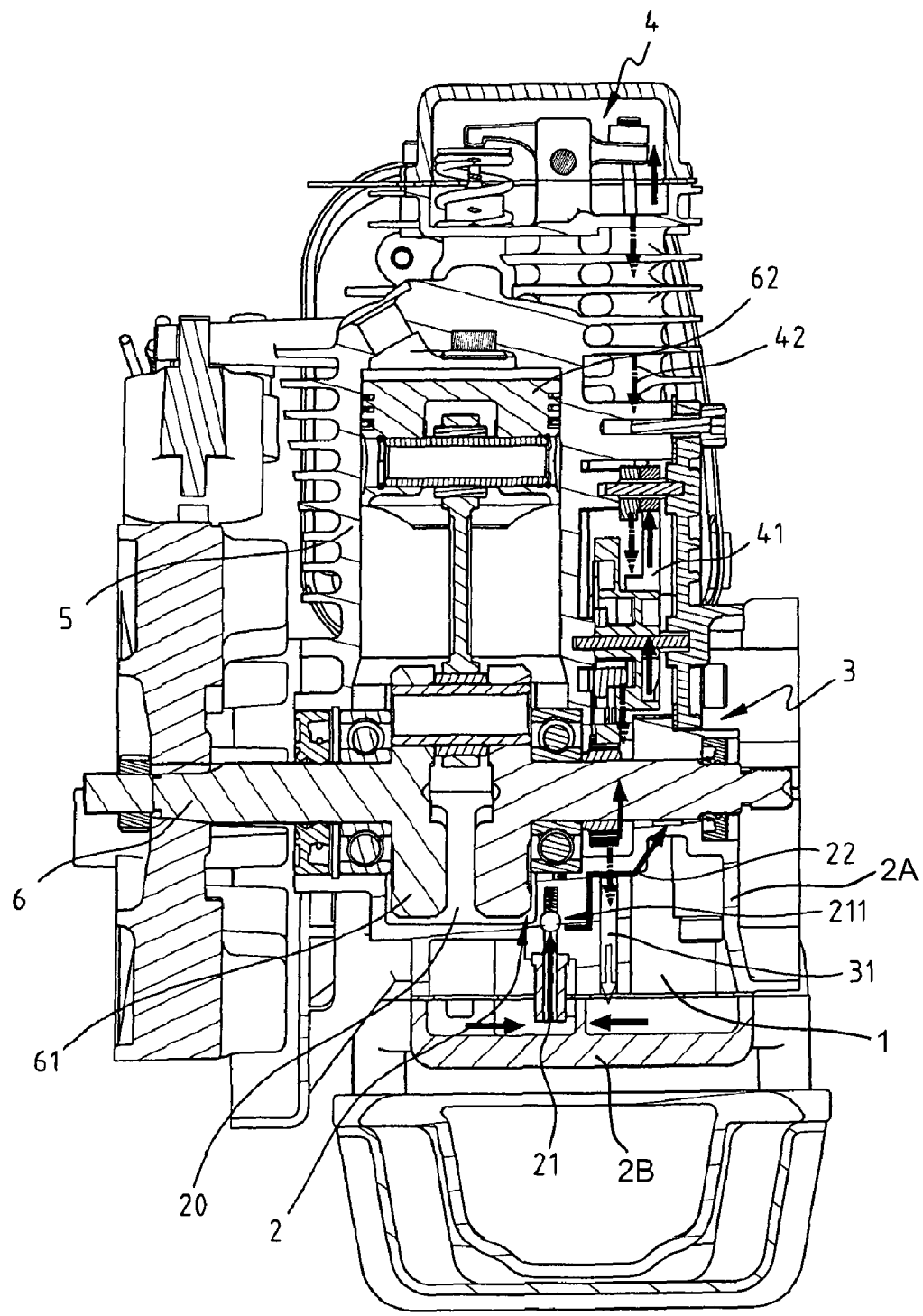
FIG. 1 is a front sectional view of a lubrication system for a four-stroke engine according to a first embodiment of the present disclosure.

With reference to FIGS. 1-3 and 8-15, a lubrication system for a four-stroke engine according to a preferred embodiment of the present disclosure includes an oil pan 1, a crankcase 2, a gear assembly room 3, a rocker-arm chamber 4 and a gas-oil separator 7. The oil pan 1 is provided for storing lubrication oil. A crankshaft 6 having a balance weight 61 is disposed in the crankcase 2 and coupled with a piston 62 that is disposed in a cylinder 5. Further, two ends of the crankshaft 6 are respectively mounted with a flying wheel and a gear assembly that is disposed in the gear assembly room 3.

Figure 6:
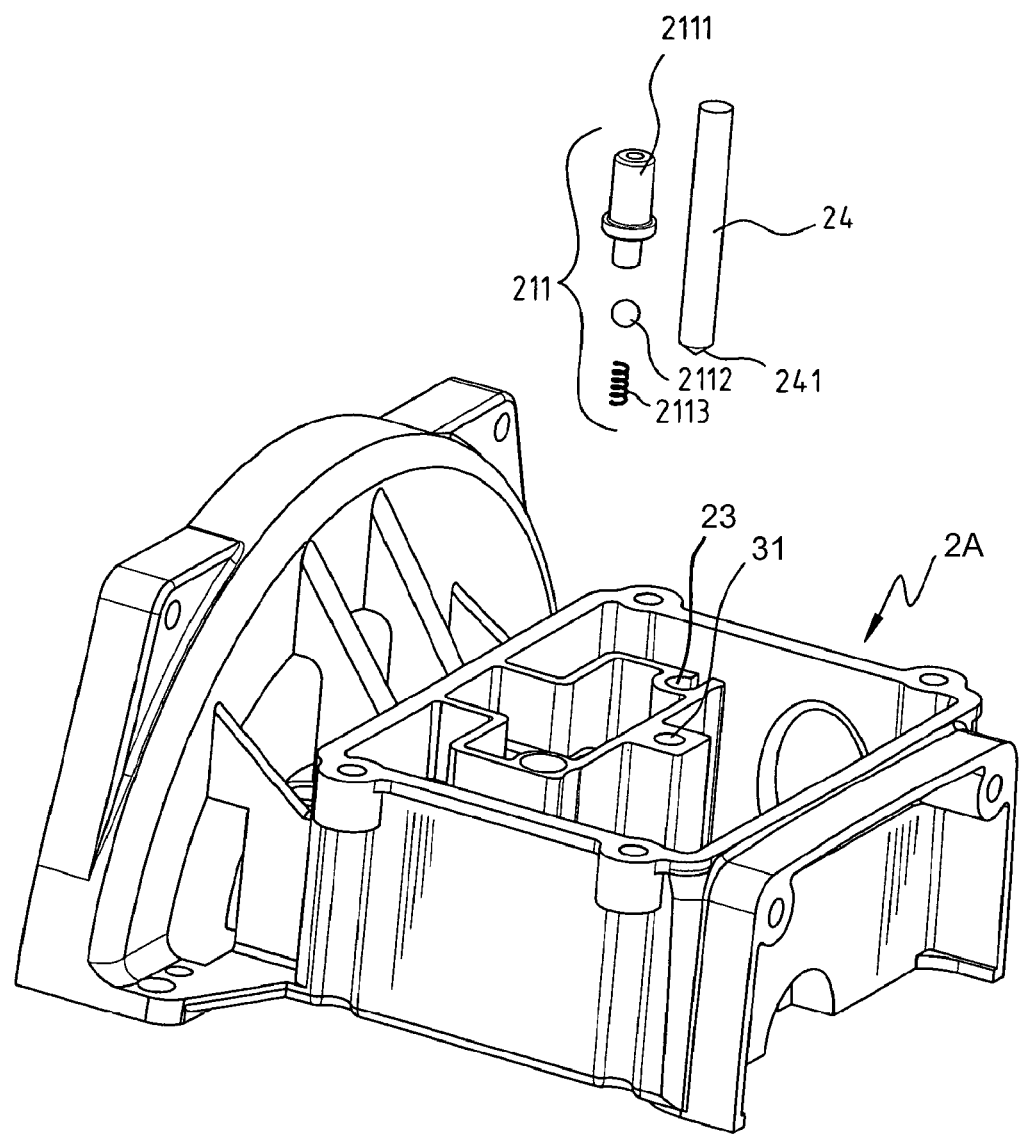
FIG. 6 is a perspective view showing from below the first body of the crankcase according to the first embodiment of the present disclosure.

Moreover, the oil pan 1 is communicated with the crankcase 2 by an oil suction passage 21, and a first check valve 211 is disposed in the oil suction passage 21. With reference to FIG. 6, the first check valve 211 according to a preferred configuration of the present disclosure includes a valve body 2111 disposed in the oil suction passage 21, a ball 2112 and a spring 2113 that acts on the ball 2112. When the first check valve 211 experiences no external forces, the ball 2112 keeps on plugging the valve body 2111 and blocking off the oil suction passage 21, so as to prevent the lubrication oil in the crankcase 2 from flowing back to the oil pan 1. As the crankcase 2 is in negative pressure that resists against the elasticity of the spring 2113, the ball 2112 breaks away from the valve body 2111 so that the lubrication oil in the oil pan 1 flows into the crankcase 2.

Figure 4:
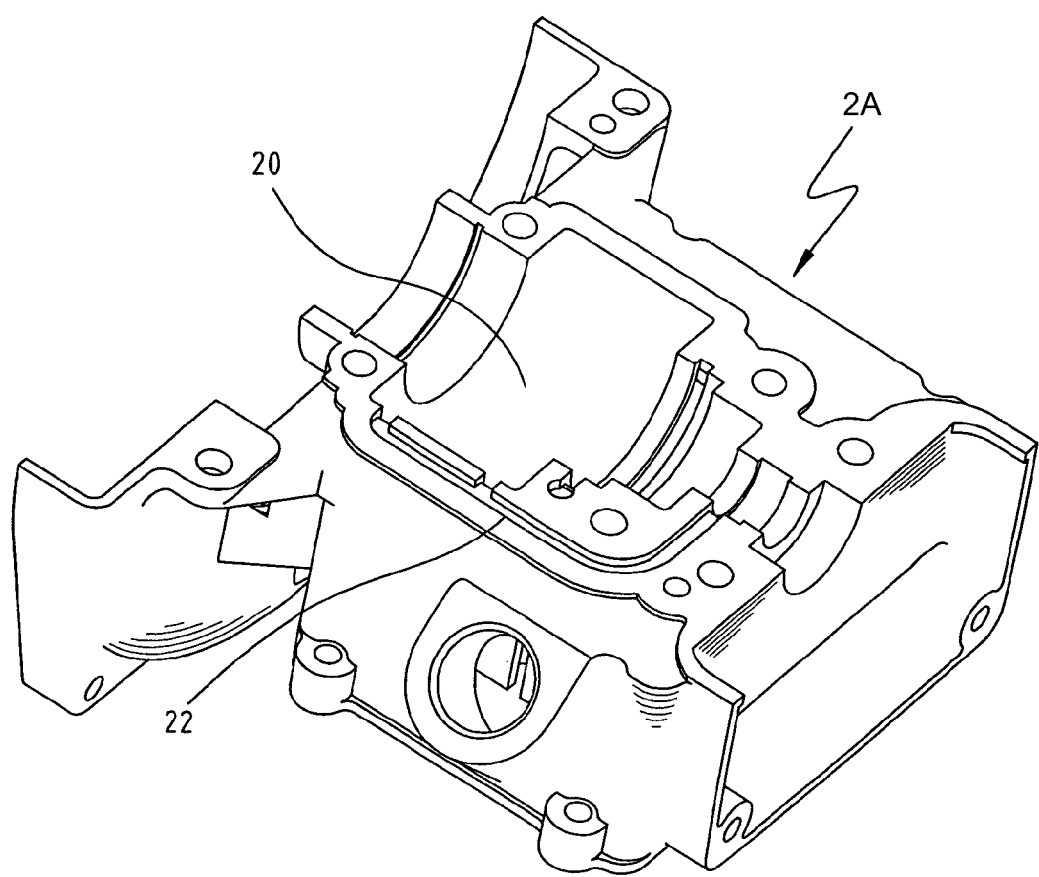
FIG. 4 is a perspective view showing from above a first body of a crankcase according to the first embodiment of the present disclosure.
Figure 5:
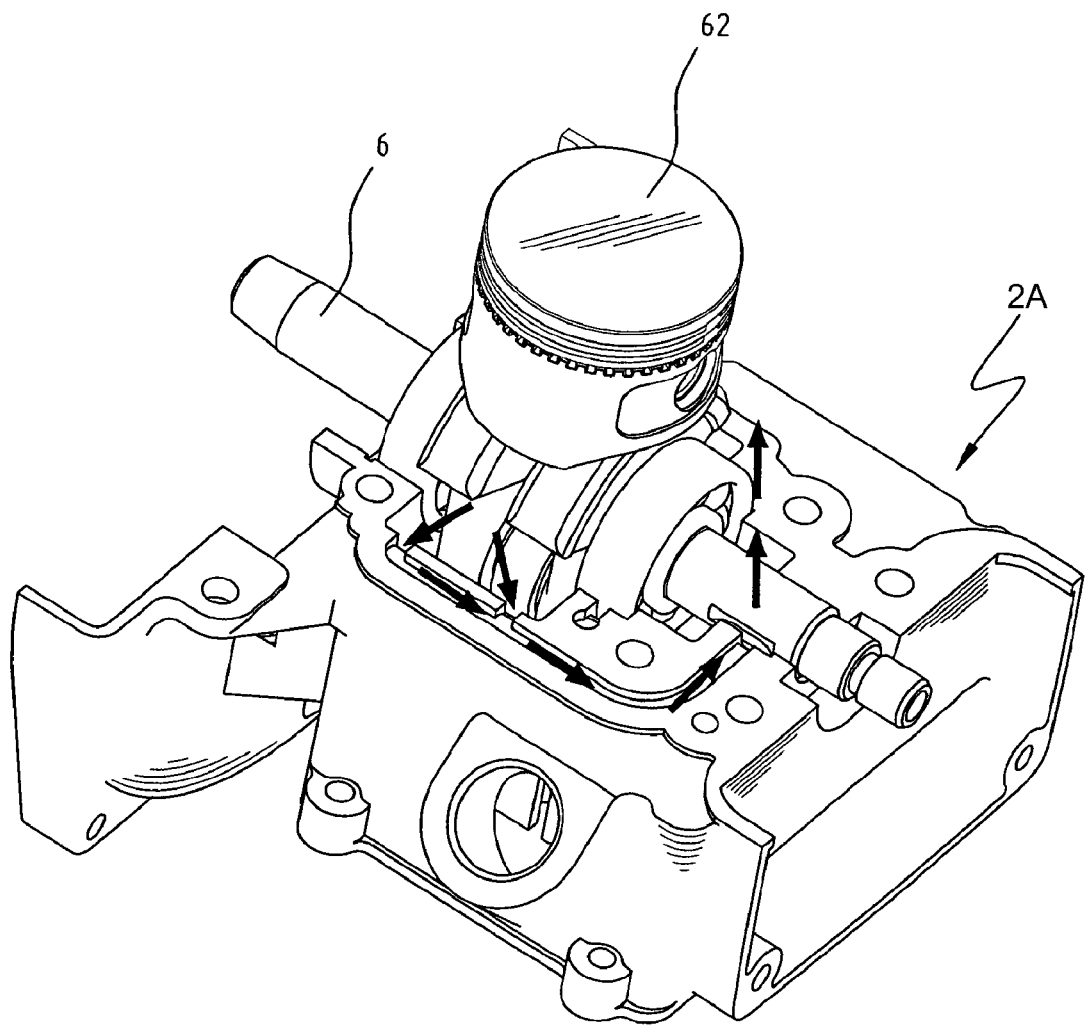
FIG. 5 is a perspective view showing the first body of the crankcase in FIG. 4, which is assembled with a crankshaft and a piston.

The crankcase 2 is communicated with the gear assembly room 3 by a first oil delivery passage 22 in which a fourth check valve 221 is disposed, which valve 221 may be of a rotary type. Preferably, the fourth check valve 221 prevents a flow from the gear assembly room 3 to the crankcase 2 for negative pressure in the crankcase 2. FIGS. 4 and 5 show a preferred way of arranging this rotary valve in a cost effective way. This engine has a so called long cylinder 5 that reaches down to the center of the crankcase 2. A first body 2A of the crankcase 2 has a mounting plane for a cylinder. In this plane a groove 22 is formed when casting the first body. The cylinder 5 closes the groove 22 when mounted so a duct is formed. This duct is formed without any machining, i.e. without extra cost. Of course the groove 22 could have been formed in the mounting plane of the cylinder 5 instead or in both mounting planes. This duct runs in a horizontal plane from at least one inlet from a crankshaft chamber 20 to the periphery of the crankshaft 6 where it meets a recess in the crankshaft 6 at a special position of the piston 62, in this case around BDC. (Bottom Dead Center) An outlet duct is arranged to also meet the crankshaft recess, so there is a flow from the crankcase 2 to the gear assembly room 3. It is possible to arrange a second groove on the other side of the crankshaft 6. This groove/duct would be effective 180 degrees offset from the groove 22 and could preferably be used together with the same recess in the crankshaft 6 to create an inflow to the crankshaft chamber 20 when the piston 6 is around TDC. (Top Dead Center) A crankcase 2 for a short cylinder 5 would instead have two crankcase bodies and a vertical mounting plane between these. Likewise one or two grooves/ducts could be arranged in this vertical plane. At least one groove can be arranged in a mounting plane between a crankcase body 2A and a cylinder 5 or in a mounting plane between two crankcase bodies, such that at least one duct is created from the crankshaft chamber 20 to the crankshaft 6 and intended to cooperate with a recess in the crankshaft 6. The gear assembly room 3 is communicated with the rocker-arm chamber 4 by a second oil delivery passage 41, and the gear assembly room 3 is communicated with the oil pan 1 by a third oil delivery passage 31. Also, a first oil return passage 42 connects between the rocker-arm chamber 4 and the crankcase 2, and a second check valve 421 is disposed in the first oil return passage 42. In one configuration of the present disclosure, the second check valve 421 is made of a polymeric or rubber material. As the polymeric check valve experiences no external forces, an opening of the check valve can be blocked off due to the elasticity itself. As the polymeric check valve is acted by the pressure, the opening will be opened.

Furthermore, the gas-oil separator 7 is communicated with the crankcase 2 by a second oil return passage 71, on which a third check valve 711 is disposed. The third check valve 711 may also be made of a polymeric material, which is the same as the second check valve 421. Also, the gas-oil separator 7 is communicated with the oil pan 1 by a gas intake passage 72, and the gas-oil separator 7 is communicated with the cylinder 5 by a gas outlet passage 73.

Preferably, the oil pan 1 is communicated with the gas-oil separator 7 by the gas intake passage 72, so as to enable a flow of gas from the oil pan 1 to the gas-oil separator 7 and/or a flow of oil from the gas-oil separator 7 to the oil pan 1.

Alternatively, the first-, the second- and the third check valves 211, 421, 711 are one and the same valve 211, 421, 711, which valve 211, 421, 711 is e.g. a rotary valve. Such rotary valve can be formed analogous to the valve 221 in FIG. 4-5, or e.g. by a through-hole in the crankshaft 6, which first end is disposed in the crankcase 2 and the second being distanced from the first end and being arranged to open between certain angles of rotation. Preferably, the rotary valve is open only for negative pressure in the crankcase 2, which in a preferred configuration implies that the oil suction passage 21 and the first- and the second oil return passage 42, 71 are arranged to be fluidly connected to each other and to the crankcase 2 only for negative pressure. The passages 71, 42 and 21 can be attached to the crankcase 2 as three inlets to the rotary valve, e.g. side by side. All three would therefore be opened and closed appr. at the same time. Hereby an unintentional crossflow between 42, 71 and 21 can be avoided. The negative pressure implies that the gas/lubrication oil is sucked through said passages 21, 42, 71 from the oil pan 1, the rocker-arm chamber 4 and the gas-oil separator 7 into the crankcase 2. For positive pressure in the crankcase 2 the rotary valve is closed and there is no such connection between each of the three passages 21, 42, 71 or between the three passages 21, 42, 71 and the crankcase 2. It is of course possible to have an arrangement where e.g. two of the three passages 21, 42, 71 are fluidly connected to one another, or e.g. one of the three passages 21, 42, 71 and the crankcase 2, also for positive pressure in the crankcase 2.

The crankcase 2 includes a first body 2A (see FIG. 1-7) according to the embodiment of the present disclosure. The first body 2A includes a crankshaft chamber 20 provided for accommodating the crankshaft 6 and the balance weight 61. Moreover, a first oil delivery passage 22 is provided on an edge of the first body 2A for communicating the crankshaft chamber 20 and the gear assembly room 3 (the arrows in FIG. 5 indicate a flow path of the lubrication oil from the crankshaft chamber to the gear assembly room). Furthermore, the second body 2B, shaped like a lower lid, is assembled with the first body 2A thereby closing the oil pan 1. The first body 2A is provided with an oil suction passage 21 and a gas delivery passage 23, in which a pin pole 24 is disposed. One end of the pin pole 24 is formed with a taper portion 241, the outer diameter of which is larger than an exit of the gas delivery passage 23. The gas delivery passage 23 communicates with the gas intake passage 72.

Figure 7:
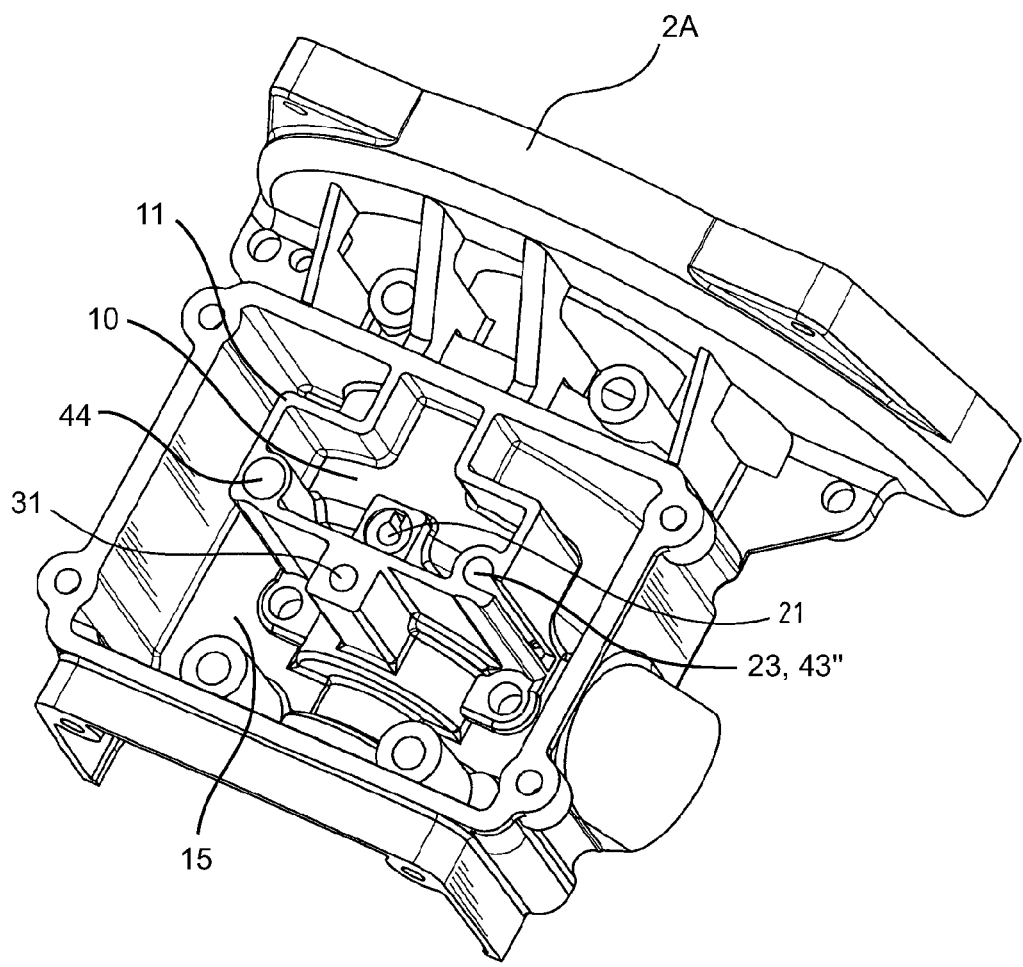
FIG. 7 is a perspective view showing the first body of the crankcase from below but from another direction of view according to the first embodiment of the present disclosure.

FIG. 7 shows the first body 2A from below, which first body 2A also forms the upper part of the oil pan 1. The oil pan 1 is closed by assembling the second body 2B below the first body 2A. Further, the oil pan 1 is divided into an outer volume 15 and an inner oil intake volume 10, in which oil intake volume 10 the oil suction passage 21 has its opening, preferably in the lower part of the oil intake volume 10. When assembling the second body 2B to the first body 2A also the oil intake volume 10 is closed, by mating first interior walls 11 in the first body 2A with second interior walls 12 (See FIG. 2) in the second body 2B. However, the first or preferably the second interior walls 12 are provided with small orifices (not shown) for allowing oil to flow between the oil intake volume 10 and the outer volume 15, which orifices are preferably disposed close to the bottom of the oil pan 1. As oil is sucked into the crank chamber through the suction passage 21 more oil will flow through the orifices from the outer volume 15 into the oil intake volume 10 to fill it up to substantially the same level as for the outer volume 15. The oil intake volume has a volume less than 50% of the total oil pan volume, and preferably less than 40%, and preferably even less than 30% or even 20%. Thus, for an upright position of the engine the opening of the oil suction passage 21 will preferably be covered in oil. When the engine is inclined, oil will flow from the oil intake volume 10 into the outer volume 15 through said small orifices, preferably leaving enough oil in the oil intake volume 10 to still cover the opening of the oil suction passage 21. Preferably, the oil suction passage 21 is covered in oil also for the upside down state of the engine. For the upside down state there is no flow of oil into the oil intake volume 10 from the outer volume 15. This implies that after having operated in an upside down state of the engine for some time so much oil has been sucked into the crank chamber that the level of the oil in the oil intake volume 10 has sunk to a level for which the oil suction passage 21 is not covered in oil. This implies that no more oil is sucked into the crank chamber which is advantageous, because having much oil in the crank chamber for the upside down state of the engine may imply an extensive leakage of oil into the combustion chamber. Also, if the check valve in the oil suction passage 21 is not closed properly for some reason and the engine is left for a long time in the upside down state, just a limited volume of oil will leak into the crank chamber. Alternatively, the oil suction passage is never covered in oil for the upside down state of the engine. Alternatively, the suction channel 21 has an opening at a point in the oil pan 1 which is above the oil level irrespective of the angle of inclination of the engine. Alternatively, also at least one of the third oil delivery passage 31 or a third oil return passage 43; 43'; 43" or a bypass channel 44 has an outlet end inside the oil intake volume 10 to help fill this volume.

Figure 2:
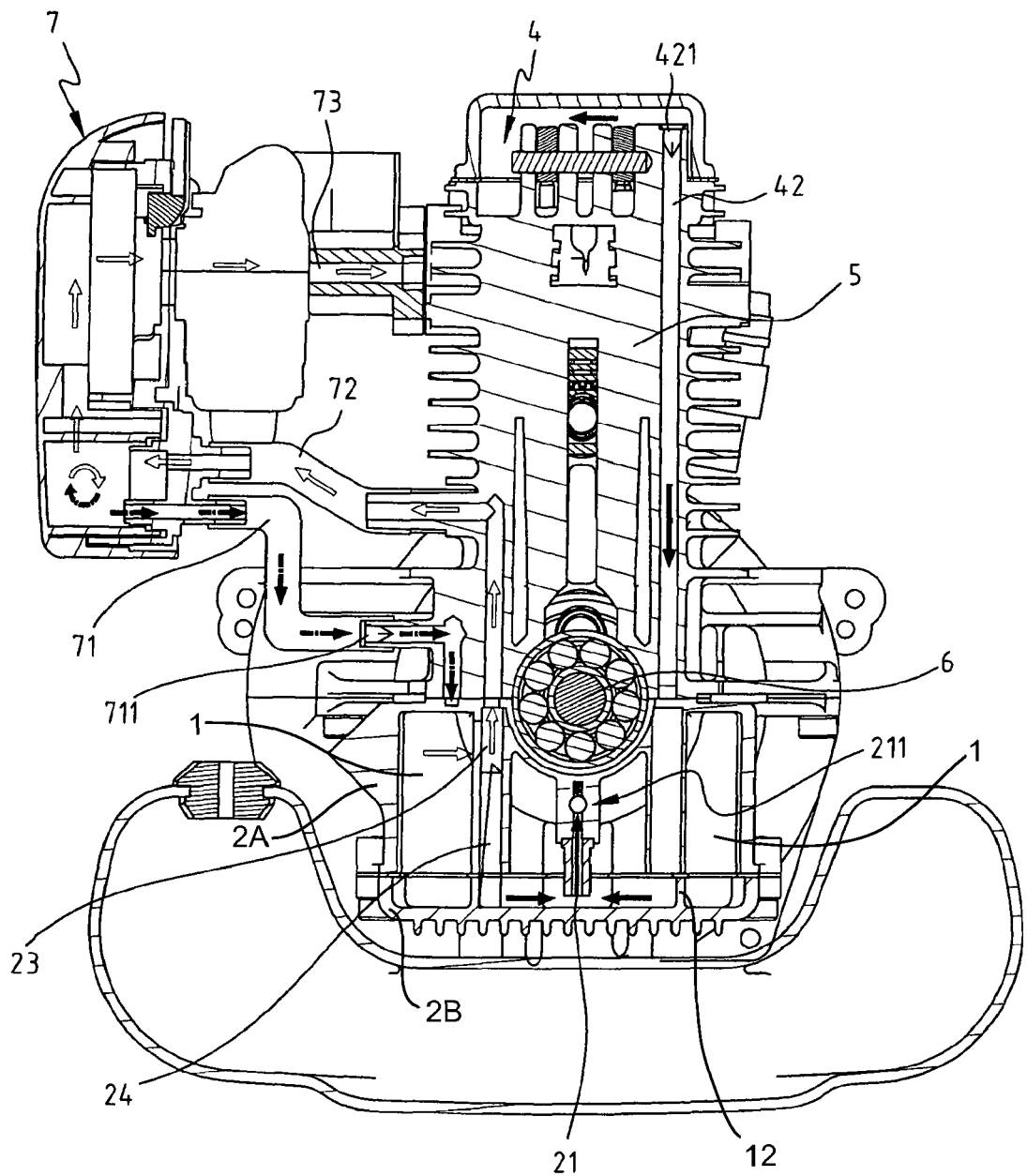
FIG. 2 is a side sectional view of the lubrication system for the four-stroke engine according to the first embodiment of the present disclosure.
Figure 3:
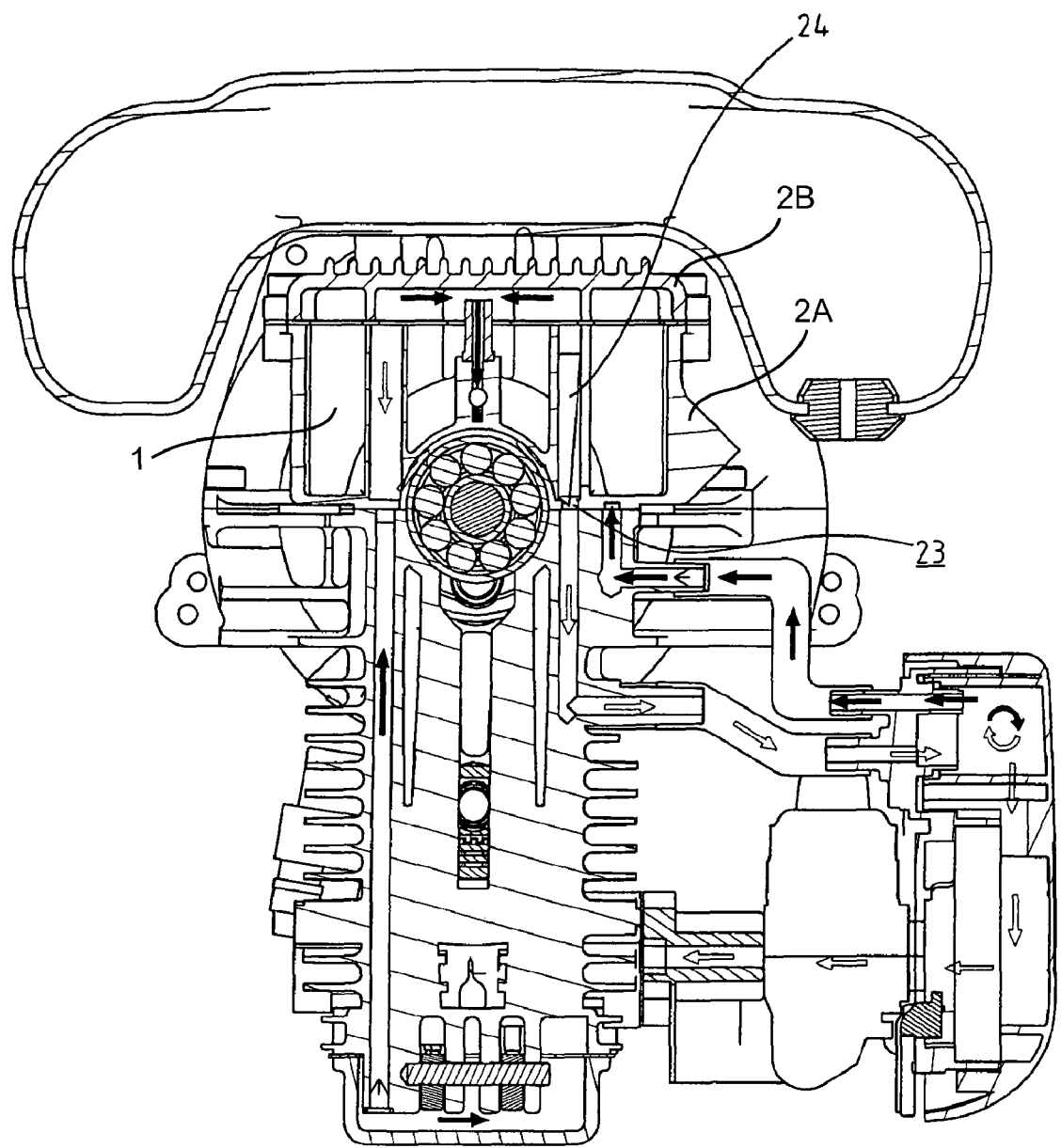
FIG. 3 shows that a gas delivery passage is blocked off, as the engine in FIG. 2 is turned upside down.

FIG. 1 and FIG. 2 show the operation of the lubrication system for the four-stroke engine according to the present disclosure, in which the solid arrows indicate a flow path of the lubrication oil, and the dashed arrows indicate a flow path of the lubrication oil mixing with the gas, and the hollow arrows indicated a flow path of the gas. When the piston 62 of the engine moves upward in the cylinder 5 to form a negative pressure in the crankcase 2, the first check valve 211, the second check valve 421 and the third check valve 711 open, so that the lubrication oil in the oil pan 1 is sucked into the crankcase 2 through the oil suction passage 21 and the lubrication oil in the rocker-arm chamber 4 is sucked into the crankcase 2 through the first oil return passage 42. Simultaneously the lubrication oil in the gas-oil separator 7 is sucked into the crankcase 2 through the second oil return passage 71. When the piston 62 moves downward to form a positive pressure in the crankcase 2, the lubrication oil and the gas in the crankcase 2 is compressed into the gear assembly room 3 through the first oil delivery passage 22. At the time the gear assembly room 3 is in positive pressure; therefore, the lubrication oil and the gas in the gear assembly room 3 is compressed into the rocker-arm chamber 4 through the second oil delivery passage 41, and is compressed into the oil pan 1 through the third oil delivery passage 31. Next, the gas entering into the oil pan 1 is in positive pressure and then be delivered into the gas-oil separator 7 through the gas intake passage 72 for the separation of the lubrication oil from the gas. The separated gas is delivered through the gas outlet passage 73 into the cylinder 5 for mixing with the fuel and being burnt together for driving the piston in reciprocating motion in the cylinder. Preferably, the gas-oil separator 7 communicates with an air inlet of the cylinder 5 by the gas outlet passage 73 so as to enable a flow from the gas-oil separator 7 to the cylinder 5. Also, the separated lubrication oil is sucked into the crankcase 2 through the second oil return passage 71 as the piston moves upward. Accordingly, the lubrication oil circulation of the engine is completed.

The lubrication system for the four-stroke engine according to the present disclosure can lubricate parts of the engine without oil pumps. Moreover, with reference to FIG. 3, as the engine is inclined at any angles or even turned upside down, the pin pole 24 disposed in the gas delivery passage 23 moves downward by making use of the weight itself and blocks off the exit of the gas delivery passage 23, so as to prevent the gas and the lubrication oil from being delivered into gas-oil separator 7 and then entering the combustion chamber of the cylinder, which may cause engine flameout. At the same time, the lubrication system can maintain the lubrication function of the engine even at an inclined angle. This type of valve may be used for the same purpose in the third oil delivery passage 31 (see reference numeral 311 in FIG. 11), preventing lubrication oil from flowing from the oil pan 1 into the gear assembly room 3 when the engine is operated at an inclined angle.

Further, the gas delivery passage 23 may be left out and replaced with an extended gas intake passage 72, for communicating the oil pan 1 with the gas-oil separator 7. In such configuration an opening of the gas delivery passage 72 may be disposed in the oil pan 1 at a position that is always above the oil level irrespective of angle of inclination of the engine. Thereby, lubrication oil is prevented from flowing into the gas-oil separator 7 from the oil pan 1.

Figure 8:
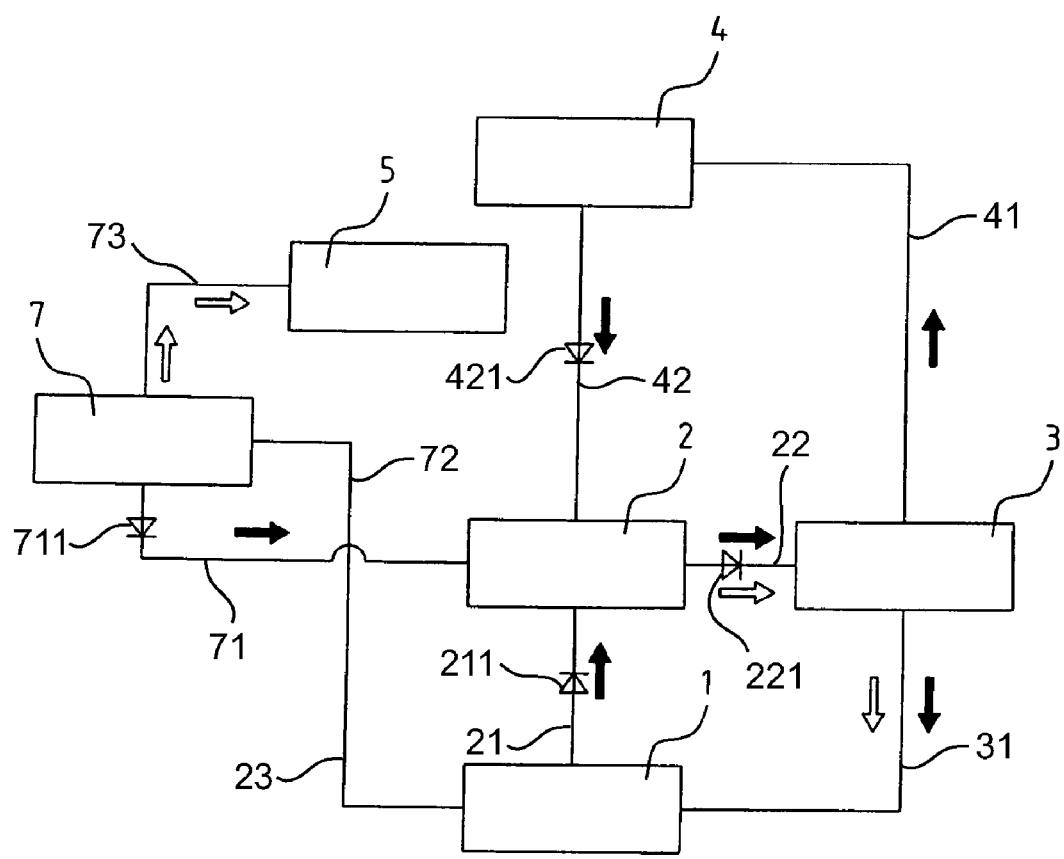
FIG. 8 is a schematic view showing a lubrication oil flow path of the lubrication system according to the first embodiment of the present disclosure.

FIG. 8 is a schematic view showing a lubrication oil flow path of the lubrication system according to the first embodiment of the present disclosure, in which the solid arrows indicate the flow direction of the lubrication oil and the hollow arrows indicate the flow direction of the gas. In FIG. 8, when the piston moves upward in the cylinder to form a negative pressure in the crankcase 2, the lubrication oil in the oil pan 1, the rocker-arm chamber 4 and the gas-oil separator 7 is sucked into the crankcase 2 simultaneously. When the piston moves downward to form a positive pressure in the crankcase 2, the lubrication oil and the gas in the crankcase 2 are compressed into the gear assembly room 3. At the same time the gear assembly room 3 is in positive pressure; therefore, the lubrication oil and the gas in the gear assembly room 3 are compressed into the rocker-arm chamber 4 and the oil pan 1 simultaneously. The gas in the oil pan 1 is in positive pressure and enters into the gas-oil separator 7 for the separation of the lubrication oil from the gas. The separated gas is delivered into the cylinder 5 to be mixed with the fuel and burnt together, and the separated lubrication oil is sucked into the crankcase 2 as the piston moves upward. Accordingly, the lubrication oil circulation of the engine is completed. Alternatively, the oil pan 1 is communicated with the gas-oil separator 7 by the gas intake passage 72, so as to enable a flow of gas from the oil pan 1 to the gas-oil separator 7 and/or a flow of oil from the gas-oil separator 7 to the oil pan 1.

Figure 9:
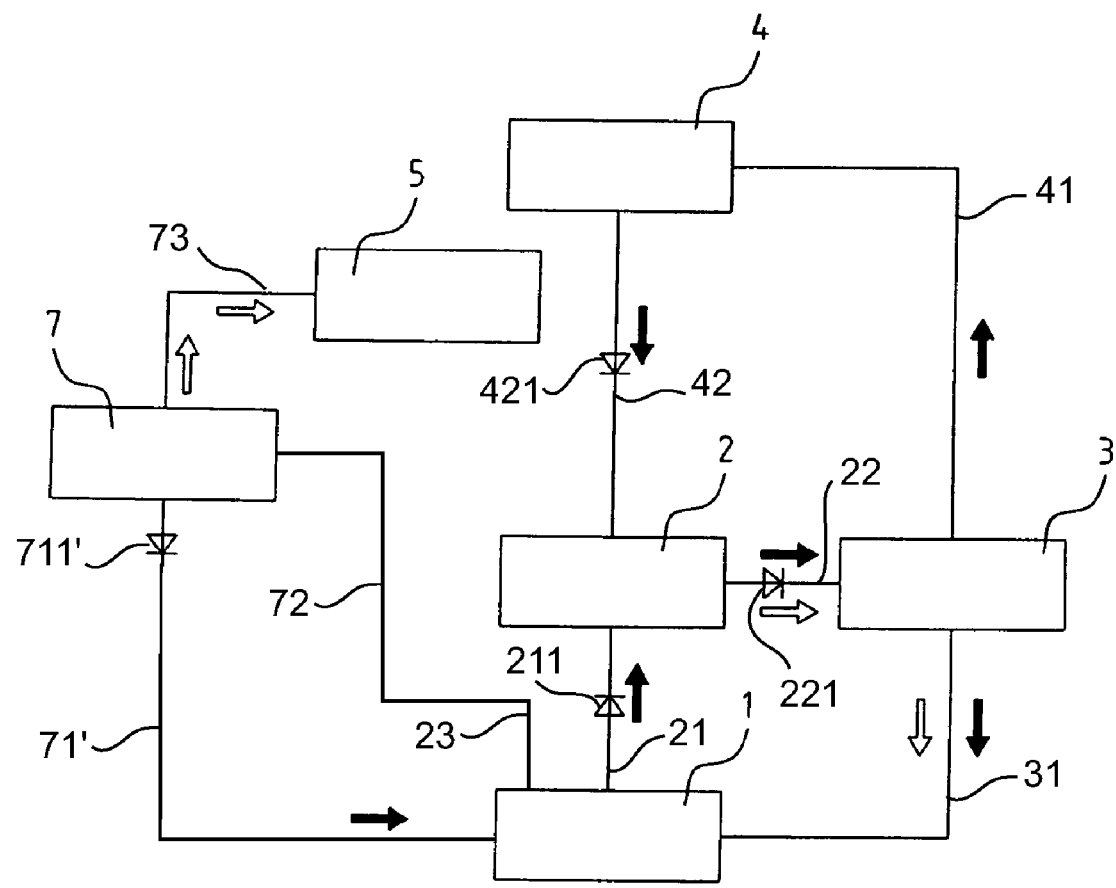
FIG. 9 is a schematic view showing a lubrication system according to a second embodiment of the present disclosure.

FIG. 9 is a schematic view showing the lubrication oil flow path of the lubrication system according to the second embodiment of the present disclosure, wherein the second oil return passage 71', in which the third check valve 711' is disposed, communicates the gas-oil separator 7 with the oil pan 1 and the gas intake passage 72 communicates the oil pan 1 with the gas-oil separator 7. Thereby, gas flows from the oil pan 1 into the gas-oil separator 7 for positive pressure in the oil pan 1 and lubrication oil flows from the gas-oil separator 7 to the oil pan 1 for negative pressure in the oil pan 1.

Alternatively, the gas-oil separator 7 is communicated with the oil pan 1 by a second oil return passage 71' and the third check valve 711' is disposed in said oil return passage 71', so as to prevent a flow of oil from the oil pan 1 to the gas-oil separator 7. The check valve 711' may be of gravity sensitive type.

Figure 10:
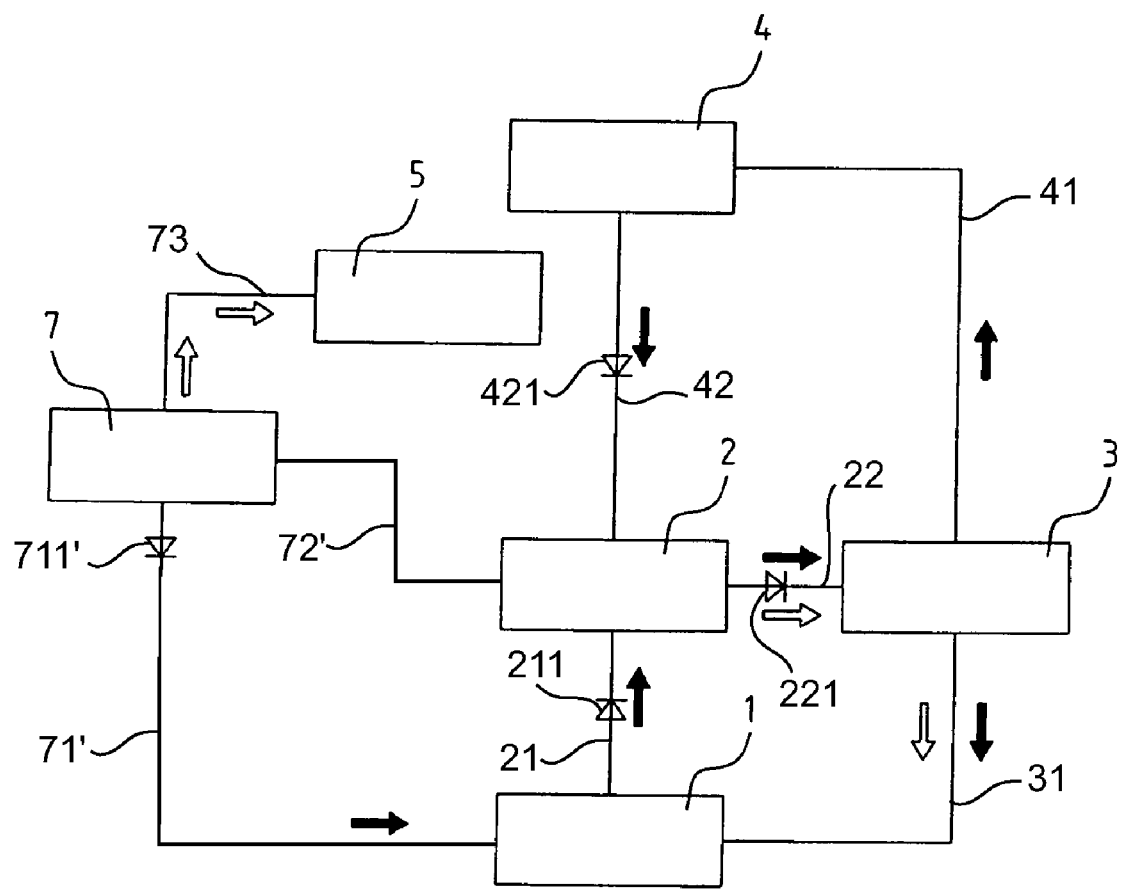
FIG. 10 is a schematic view showing a lubrication system according to a third embodiment of the present disclosure.
Figure 11:
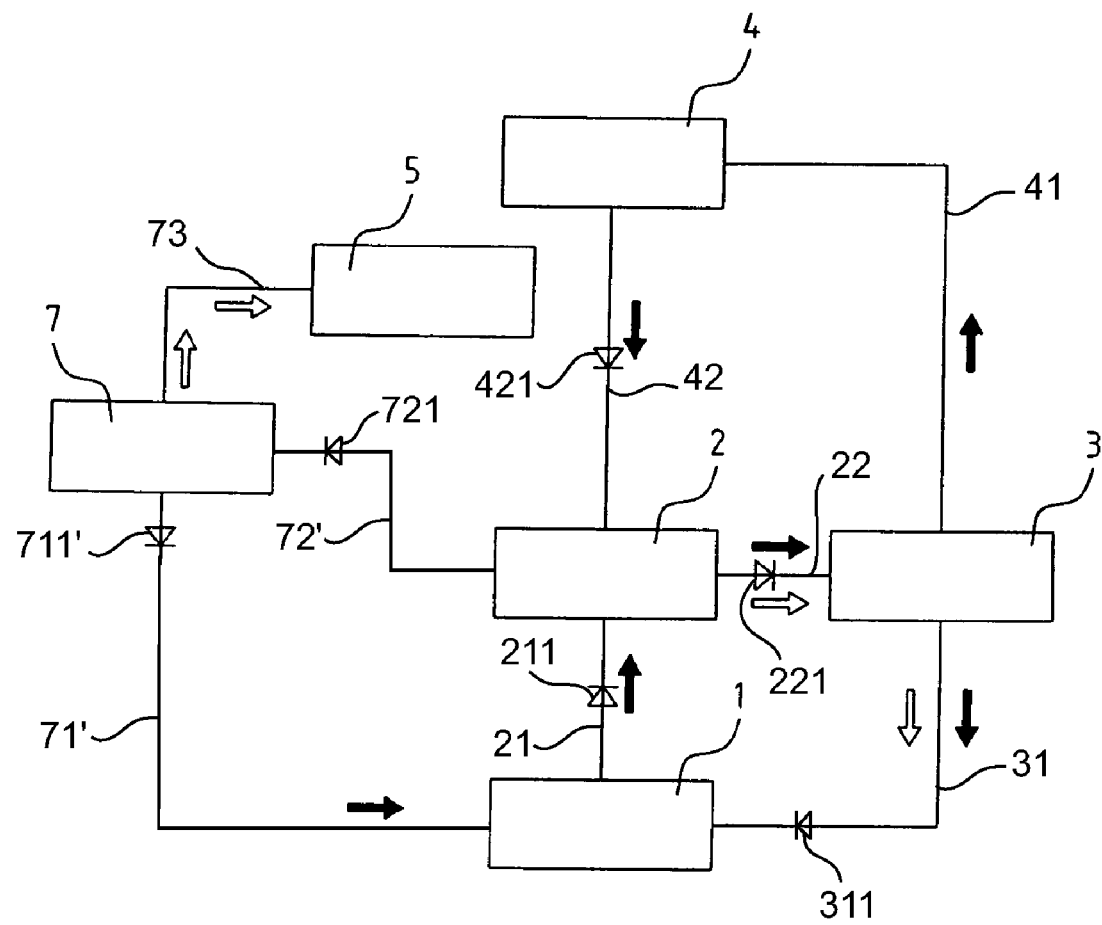
FIG. 11 is a schematic view showing a lubrication system according to another configuration of the third embodiment of the present disclosure.

FIGS. 10 and 11 are schematic views showing the lubrication oil flow path of the lubrication system according to the third embodiment of the present disclosure, wherein the second oil return passage 71', in which the third check valve 711' is disposed, communicates the gas-oil separator 7 with the oil pan 1 and the gas intake passage 72' communicates the crankcase 2 with the gas-oil separator 7. Thereby, gas flows from the crankcase 2 into the gas-oil separator 7 for positive pressure in the crankcase 2 and lubrication oil flows from the gas-oil separator 7 into the oil pan 1 for negative pressure in the oil pan 1. For preventing gas/lubrication oil from flowing from the gas-oil separator 7 into the crankcase 2 a fifth check valve 721 may be disposed in the gas intake passage 72', as indicated in FIG. 11, only allowing a flow in a direction from the crankcase 2 into the gas-oil separator 7. The valves 721 and 221 can be arranged as one and the same rotary valve analogous to what has been described for the valves 211, 421, 711 with reference to FIG. 4-5. The ducts 22 and 72' can then be connected as two separate ducts to the same rotary valve 721, 221.

Figure 12:
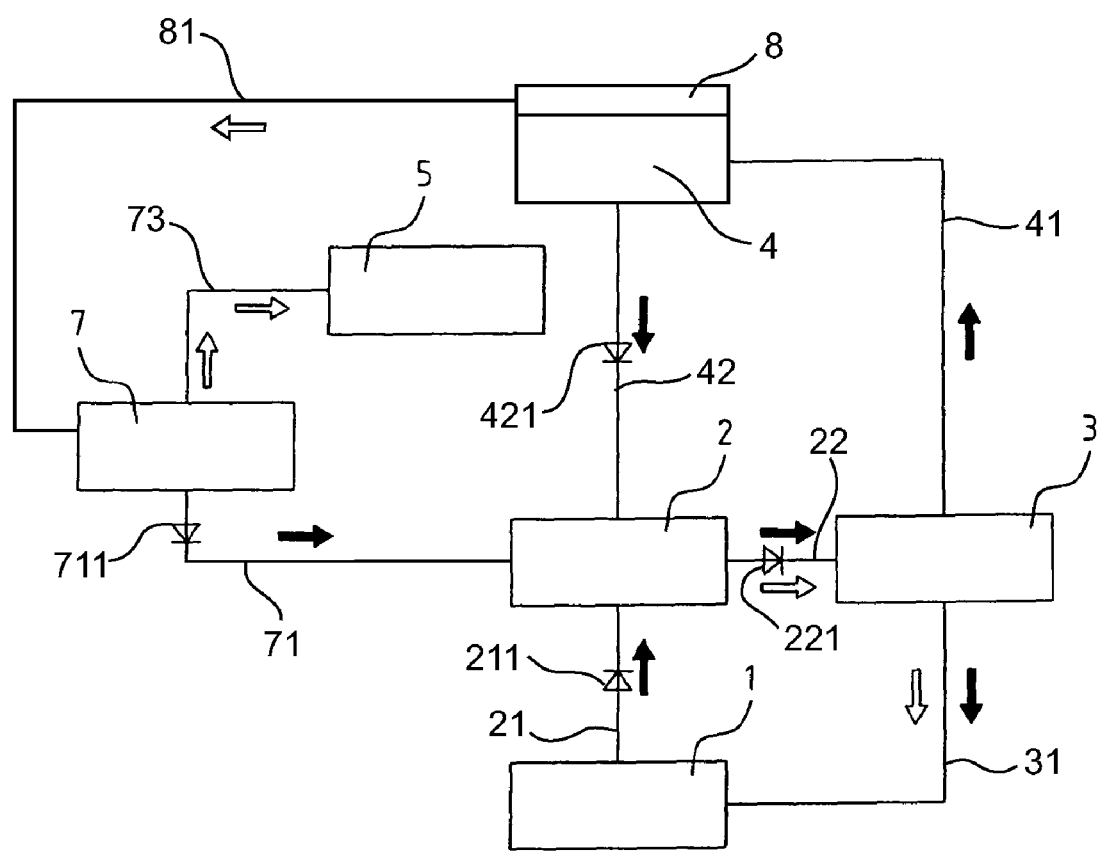
FIG. 12 is a schematic view showing a lubrication system according to a fourth embodiment of the present disclosure.

FIG. 12 is a schematic view showing the lubrication oil flow path of the lubrication system according to a fourth embodiment of the present disclosure, wherein a gas intake channel 81 communicates an uppermost chamber 8 with the gas-oil separator 7. The uppermost chamber 8 is disposed on top of the rocker-arm chamber 4 and is communicated with the rocker-arm chamber 4 through a number of orifices. Thereby, for positive pressure in the rocker-arm chamber 4, gas flows from the rocker-arm chamber 4 through the number of orifices to the uppermost chamber 8 and via the gas intake channel 81 to the gas-oil separator 7. Alternatively, the uppermost chamber 8 is a part of the rocker-arm chamber 4. Thereby, the rocker-arm chamber 4 communicates with the gas-oil separator 7 by a gas intake channel 81, so as to enable a flow from the rocker arm chamber 4 to the gas-oil separator 7. The gas-oil separator 7 is in turn communicated with the crankcase 2 through the second oil return channel 71 in which the third check valve 711 is disposed. Thereby, separated oil flows in a direction from the gas-oil separator 7 to the crankcase 2 for negative pressure in the crankcase 2. Unlike the first, second and third embodiments, there is no direct communication between the oil pan 1 and the gas-oil separator 7. Similar to these embodiments there is a first oil return passage 42 with a check valve 421, preferably a piston ported—check valve or a rotary valve—check valve, as discussed. The first oil return passage is the only oil return passage from the rocker arm chamber 4. This is a clear simplification compared to U.S. Pat. No. 6,213,079.

Figure 13:
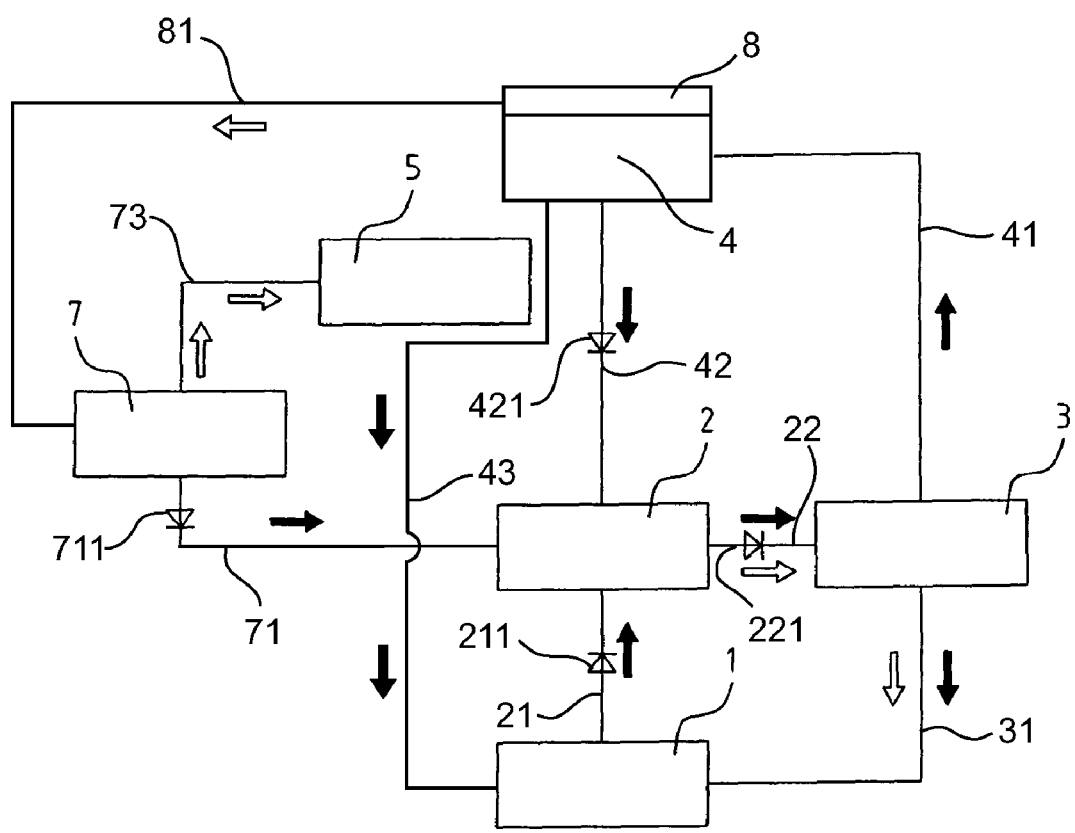
FIG. 13 is a schematic view showing a lubrication system according to a fifth embodiment of the present disclosure.

FIG. 13 is a schematic view showing the lubrication oil flow path of the lubrication system according to a fifth embodiment of the present disclosure. Unlike the fourth embodiment a third oil return channel 43 communicates the rocker-arm chamber 4 and the oil pan 1. The third oil return channel 43 has its first opening at a low point in the rocker-arm chamber 4, which enables oil to drain from the rocker-arm chamber 4 to the oil pan 1 through the third oil return channel 43. Preferably, the third oil return channel 43 has its other opening at a low point in the oil pan 1, at a point which will be above the level of oil for the inverted state of the engine. Thus, a backflow of oil for the upside down state of the engine from the oil pan 1 to the rocker-arm chamber 4 is prevented. Preferably the opening of channel 43 in the oil pan 43 is also well centered in the oil pan, so it will be above the level of the oil also for a sideways and/or lengthways fully inclined state of the engine.

Figure 14:
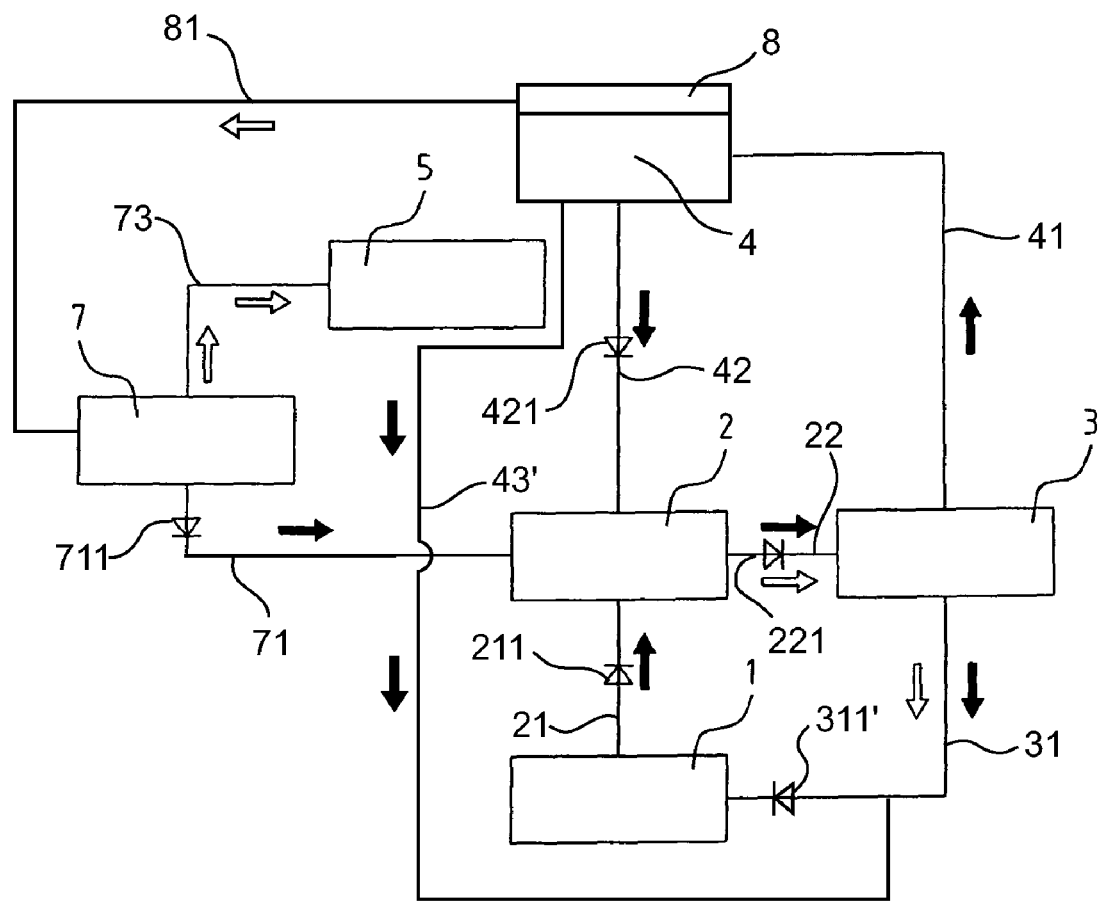
FIG. 14 is a schematic view showing a lubrication system according to a sixth embodiment of the present disclosure.

FIG. 14 is a schematic view showing the lubrication oil flow path of the lubrication system according to a sixth embodiment of the present disclosure. Unlike the fifth embodiment the third oil return channel 43' communicates the rocker-arm chamber 4 and the third oil delivery passage 31. A check valve 311', e.g. of a gravity sensitive type like a pin pole type, is disposed in the third oil delivery passage 31, so as to prevent oil from flowing from the oil pan 1 into the third oil delivery passage 31 or into the third oil return channel 43', respectively, at an inclined angle of the engine. When using a check valve the location of the opening of the passage 31 inside the oil pan is less critical. Of course it is also possible to combine the two principles, like locating the opening of a passage or a return channel well centered, but high in the oil pan and supplying the passage or channel with a check valve, that will prevent that there is a backflow of oil in the inverted state of the engine. The channel 43' and the passage 31 share a checkvalve 311' and enter the oil pan together. Instead they could have entered the oil pan independently and could have a separate check valve each.

Figure 15:
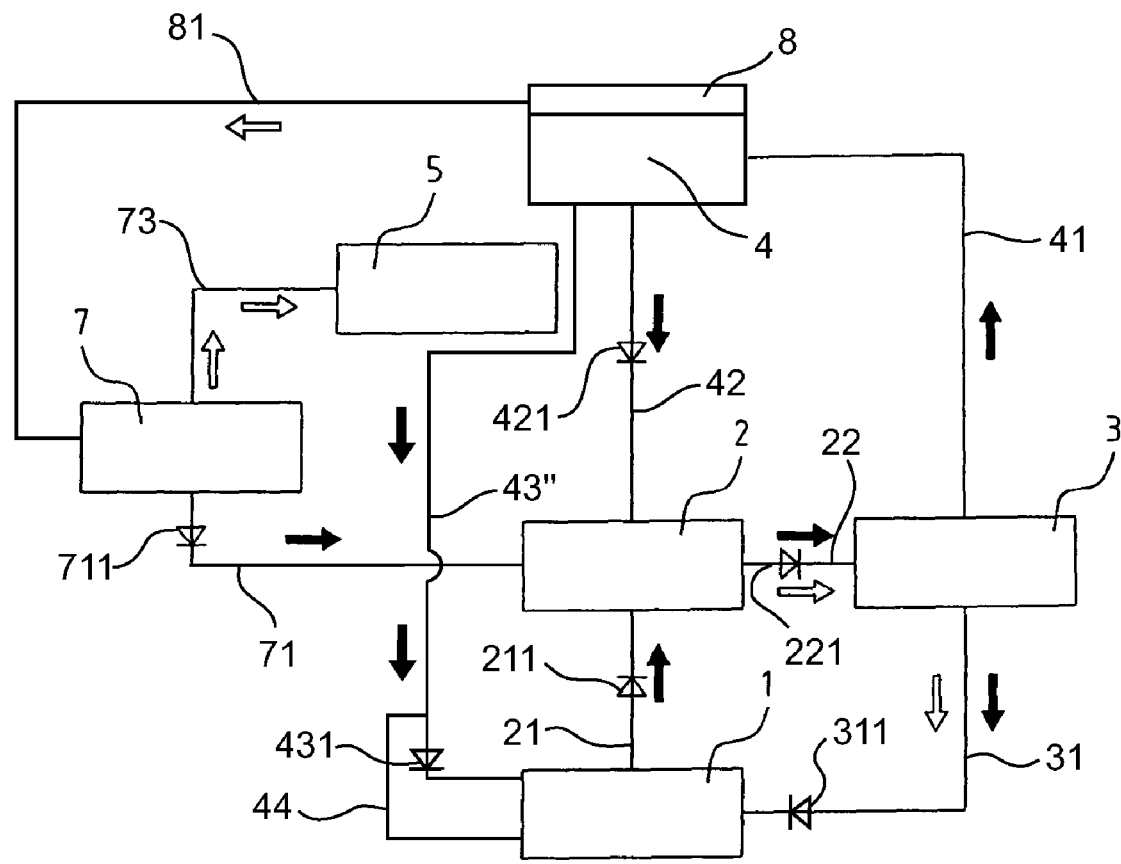
FIG. 15 is a schematic view showing a lubrication system according to a seventh embodiment of the present disclosure.

FIG. 15 is a schematic view showing the lubrication oil flow path of the lubrication system according to a seventh embodiment of the present disclosure. Unlike the fifth embodiment the third oil return passage 43" and the oil delivery passage 31 are both provided with check valves 431, 311, which close for an inverted flow of the oil pan, so as to disable a backflow of oil to the rocker-arm chamber 4 and the gear assembly room 3, respectively, at an inclined angle of the engine. The check valve 431, e.g. a gravity sensitive check valve 431 in the third oil return passage 43" is bypassed by a bypass channel 44, which has its opening at a low point in the oil pan 1, and therefore being above the level of oil for the upside down state of the engine. The check valve 431 is closed for the upside down state of the engine, but the bypass channel 44 still allows gas from the oil pan 1 to flow in a direction towards the rocker-arm chamber 4 for negative pressure in the rocker-arm chamber 4 and/or positive pressure in the oil pan 1.

Although the present disclosure has been described with reference to the preferred embodiments thereof, it is apparent to those skilled in the art that a variety of modifications and changes may be made without departing from the scope of the present disclosure which is intended to be defined by the appended claims.

What is claimed is:

1. A lubrication system for a four stroke engine, comprising:
   an oil pan for storing lubrication oil;
   a crankcase, wherein a crankshaft is disposed, which crankshaft has a balance weight and is coupled with a piston of a cylinder;
   a gear assembly room;
   a rocker-arm chamber; and
   a gas-oil separator for separating gas and oil from a mix of gas and oil;
   wherein the oil pan communicates with the crankcase by an oil suction passage, in which a first check valve is disposed; the crankcase communicates with the gear assembly room by a first oil delivery passage; the gear assembly room communicates with the rocker-arm chamber by a second oil delivery passage, and the gear assembly room communicates with the oil pan by a third oil delivery passage; the rocker-arm chamber communicates with the crankcase by a first oil return passage, in which a second check valve is disposed.

2. A lubrication system according to claim 1, wherein the first oil return passage is the only oil return passage from the rocker arm chamber.

3. A lubrication system according to claim 1, wherein the gas-oil separator communicates with the crankcase by a second oil return passage in which a third check valve is disposed, so as to enable a flow of separated lubrication oil to the crankcase from the gas-oil separator for negative pressure in the crankcase.

4. A lubrication system according to claim 3, wherein at least two of the first, the second and the third check valve are one and the same valve, which same valve is in the form of a rotary valve or a valve opened and closed by the moving piston.

5. A lubrication system according to claim 1, wherein the gas-oil separator is communicated with the oil pan by a second oil return passage in which a third check valve is disposed, so as to enable a flow of separated lubrication oil from the gas-oil separator to the oil pan for negative pressure in the oil pan.

6. A lubrication system according to claim 5, wherein the second and the third check valve are made of a polymeric or rubber material.

7. A lubrication system according to claim 1, wherein the gas-oil separator is communicated with the oil pan by a second oil return passage and a third check valve is disposed in the second oil return passage, so as to prevent a flow of oil from the oil pan to the gas-oil separator.

8. A lubrication system according to claim 1, wherein the oil pan is communicated with the gas-oil separator by a gas intake passage, so as to enable a flow of gas from the oil pan to the gas-oil separator, for positive pressure in the oil pan.

9. A lubrication system according to claim 8, wherein the gas intake passage has an opening at a point in the oil pan, which is above the oil level irrespective of an angle of inclination of the engine.

10. A lubrication system according to claim 8, wherein the oil pan is provided with a gas delivery passage communicated with the gas intake passage, in which a pin pole is disposed; as the engine is turned upside down, the pin pole is capable of plugging the exit of the gas delivery passage due to the weight of the pin pole, so that the gas and the lubrication oil are prevented from being delivered into the gas-oil separator.

11. A lubrication system according to claim 10, wherein one end of the pin pole is formed with a taper portion, the outer diameter of which is larger than the exit of the gas delivery passage so that the exit of the gas delivery passage is capable of being blocked off by the taper portion.

12. A lubrication system according to claim 1, wherein the oil pan is communicated with the gas-oil separator by a gas intake passage, so as to enable a flow of gas from the oil pan to the gas-oil separator and a flow of oil from the gas-oil separator to the oil pan.

13. A lubrication system according to claim 1, wherein the crankcase is communicated with the gas-oil separator by a gas intake passage, so as to enable a flow of gas from the crankcase to the gas-oil separator for positive pressure in the crankcase.

14. A lubrication system according to claim 13, wherein the gas intake passage is provided with a fifth check valve, for preventing a flow in a direction from the gas-oil separator to the crankcase.

15. A lubrication system according to claim 1, wherein the rocker arm chamber communicates with the gas-oil separator by a gas intake channel, so as to enable a flow from the rocker arm chamber to the gas-oil separator.

16. A lubrication system according to claim 1, wherein the gas-oil separator communicates with an air inlet of the cylinder by a gas outlet passage so as to enable a flow from the gas-oil separator to the cylinder.

17. A lubrication system according to claim 1, wherein the first oil delivery passage is provided with a fourth check valve, e.g, in the form of a rotary valve, so as to prevent a flow from the gear assembly room to the crankcase for negative pressure in the crankcase.

18. A lubrication system according to claim 1, wherein the first check valve comprises a valve body disposed in the oil suction passage, a ball and a spring acting on the ball; as the first check valve experiences no external forces, the ball keeps on plugging the valve body and blocking off the oil suction passage so as to prevent the lubrication oil in the crankcase from flowing back to the oil pan.

19. A lubrication system according to claim 1, wherein at least one groove can be arranged in a mounting plane between a crankcase body and a cylinder or in a mounting plane between two crankcase bodies, such that at least one duct is created from the crankshaft chamber to the crankshaft and intended to cooperate with a recess in the crankshaft.

20. A lubrication system according to claim 19, wherein the first oil delivery passage is formed as the at least one duct between a crankcase body and a cylinder, the first oil delivery passage being provided with a fourth check valve, which is the rotary valve formed as a recess in the crankshaft, enabling a flow out of the crankshaft chamber for certain positions of the piston, preferably for positive pressure in the crankshaft chamber.

21. A lubrication system according to claim 1, wherein a lower end of the oil suction passage, serving as an oil intake from the oil pan, is surrounded by first interior walls in a first body and mating second interior walls in a second body 2B, the interior walls separate an oil intake volume of the oil pan having a volume less than 50%, and preferably less than 40%, of the total oil pan volume, and being connected to the outer volume of the oil pan through a number of small orifices.

22. A lubrication system according to claim 21, wherein the oil intake volume is less than 30%, and preferably less than 20%, of the total oil pan volume.

23. A lubrication system according to claim 21, wherein at least one of the third oil delivery passage or a third oil return passage or a bypass channel has an outlet end inside the oil intake volume to help fill this volume.

24. A lubrication system according to claim 1, wherein the suction channel, for providing a flow from the oil pan to the crankcase for negative pressure in the crankcase, has an opening at a point in the oil pan which is above the oil level irrespective of the angle of inclination of the engine.

* * * * *